US007463527B2

(12) United States Patent
Giacobbe et al.

(10) Patent No.: US 7,463,527 B2
(45) Date of Patent: Dec. 9, 2008

(54) METHOD AND APPARATUS FOR COLLECTING DATA RELATED TO THE STATUS OF AN ELECTRICAL POWER SYSTEM

(75) Inventors: Mark C. Giacobbe, Coplay, PA (US); Thomas G. Sosinski, Quakertown, PA (US); Mohamed Maharsi, Raleigh, NC (US); Deia Salah-Eldin Bayoumi, Center Valley, PA (US)

(73) Assignee: ABB Technology AG, Zurich (CH)

( * ) Notice: Subject to any disclaimer, the term of this patent is extended or adjusted under 35 U.S.C. 154(b) by 121 days.

(21) Appl. No.: 11/598,587

(22) Filed: Nov. 13, 2006

(65) Prior Publication Data

US 2008/0112223 A1 May 15, 2008

(51) Int. Cl.
*G11C 16/06* (2006.01)

(52) U.S. Cl. ........................... 365/185.22; 365/185.02; 365/185.04; 365/185.08; 365/185.09

(58) Field of Classification Search ............. 365/189.2, 365/185.22, 185.04, 185.09, 185.02, 185.08
See application file for complete search history.

(56) References Cited

U.S. PATENT DOCUMENTS

| | | | | |
|---|---|---|---|---|
| 5,799,200 | A * | 8/1998 | Brant et al. | 713/340 |
| 7,120,050 | B2 * | 10/2006 | Kawabata et al. | 365/185.01 |
| 2006/0080515 | A1 * | 4/2006 | Spiers et al. | 711/162 |

* cited by examiner

*Primary Examiner*—Connie C Yoha
(74) *Attorney, Agent, or Firm*—Paul R. Katterle

(57) ABSTRACT

A method and an apparatus for collecting data related to a status of an electrical power system, wherein data is continuously acquired from the electrical power system and is stored, at least temporarily, in a first volatile memory. Upon the occurrence of an event, the data stored in the first volatile memory is copied and permanently stored in a second non-volatile memory.

13 Claims, 3 Drawing Sheets

METHOD AND APPARATUS FOR COLLECTING DATA RELATED TO THE STATUS OF AN ELECTRICAL POWER SYSTEM

BACKGROUND OF THE INVENTION

The present invention relates to a method and an apparatus for collecting data related to a status of an electrical power system.

As it is known, protective relays are widely used in electrical power systems. Such relays are used to monitor the functioning of the power systems and upon the occurrence of predetermined operating conditions to intervene and protect the systems from possible incoming faults and damages. This is typically accomplished by tripping an associated circuit breaker.

With the introduction of microprocessor-based electronic relays, the possibility to store data related to the status of the power system under various operating conditions, in particular at the time before, during, and after the tripping of the associated circuit breaker, and including also the inputs and outputs of the relay itself under such conditions, has become a customary requirement and a necessity for proper analyses.

To this end, many different solutions have been implemented using the various types of electronic memories presently available. The existing solutions are designed case by case by having the relay treats some specific performances and functionalities as privileged, whereas some others are partially or even completely relinquished. For example, in some cases the data stored under operating conditions are completely lost when the power feeding the relay is for some reasons switched off, in some other applications the rate between the cost of the storing units and the quantity of data that they can store is not optimized, or the access time to the storing unit is not fast enough, or the number of times that data can be stored/erased is to some extent limited, et cetera.

It would be therefore desirable to provide a solution which allows to optimize the actual relay architecture and achieve a better compromise among various possible performances and functionalities with respect to the existing solutions when collecting data related to the various states of an electric power system.

SUMMARY OF THE INVENTION

In accordance with the present invention, a method for collecting data related to a status of an electrical power system operatively coupled with a microprocessor-based relay is provided. The method comprises:

acquiring data from said electrical power system;

storing at least temporarily the acquired data in a first volatile memory; and upon the occurrence of an event, copying the data stored in said first volatile memory and permanently storing the copied data in a second non-volatile memory.

Further, the present invention provides for an electronic relay for collecting data related to a status of an electrical power system operatively coupled therewith. The relay comprises:

a microprocessor for acquiring data from said electrical power system;

at least a first volatile memory for storing the acquired data; and a second non-volatile memory for permanently storing thereon data copied from said first volatile memory upon the occurrence of an event.

The present invention also encompasses an electronic relay for collecting data related to a status of an electrical power system operatively coupled therewith, comprising:

a microprocessor, a first volatile memory for at least temporarily storing data, and a second non-volatile memory for permanently storing data thereon, wherein said microprocessor has thereon computer usable program code configured to:

acquire data from said electrical power system;

store the acquired data in said first volatile memory; and upon the occurrence of an event, copy the data stored in said first volatile memory and permanently store the copied data in a second non-volatile memory.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
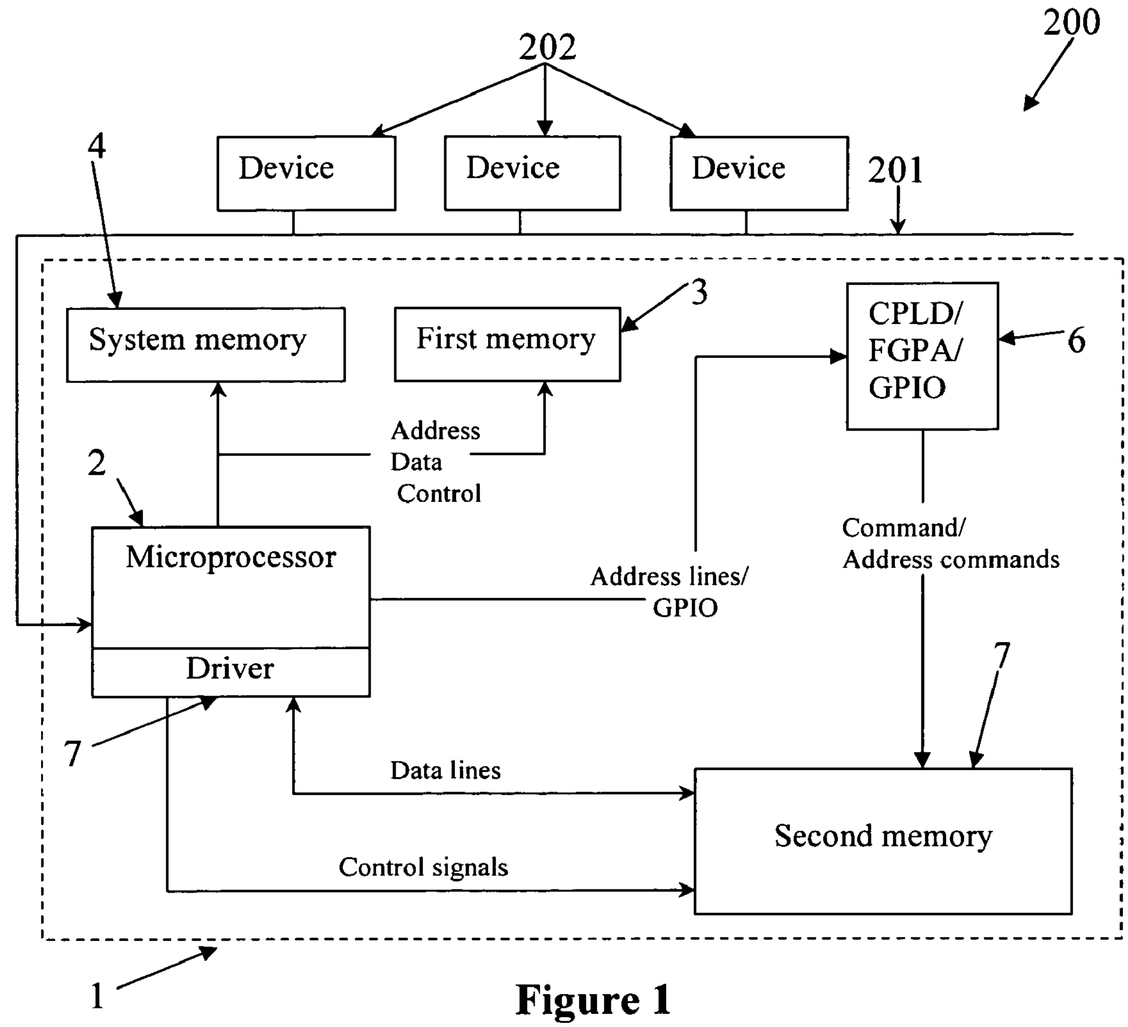
FIG. 1 is block diagram schematically illustrating an electrical power system with an electronic relay according to the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

FIG. 1 illustrates an electronic microprocessor-based relay, indicated by the overall reference number 1, which is used in a power system 200 comprising an electrical line, schematically represented by the reference number 201 and a plurality of devices operatively coupled therewith, such as loads, electrical equipments, components et cetera, which are represented by the various blocks 202.

Figure 2:
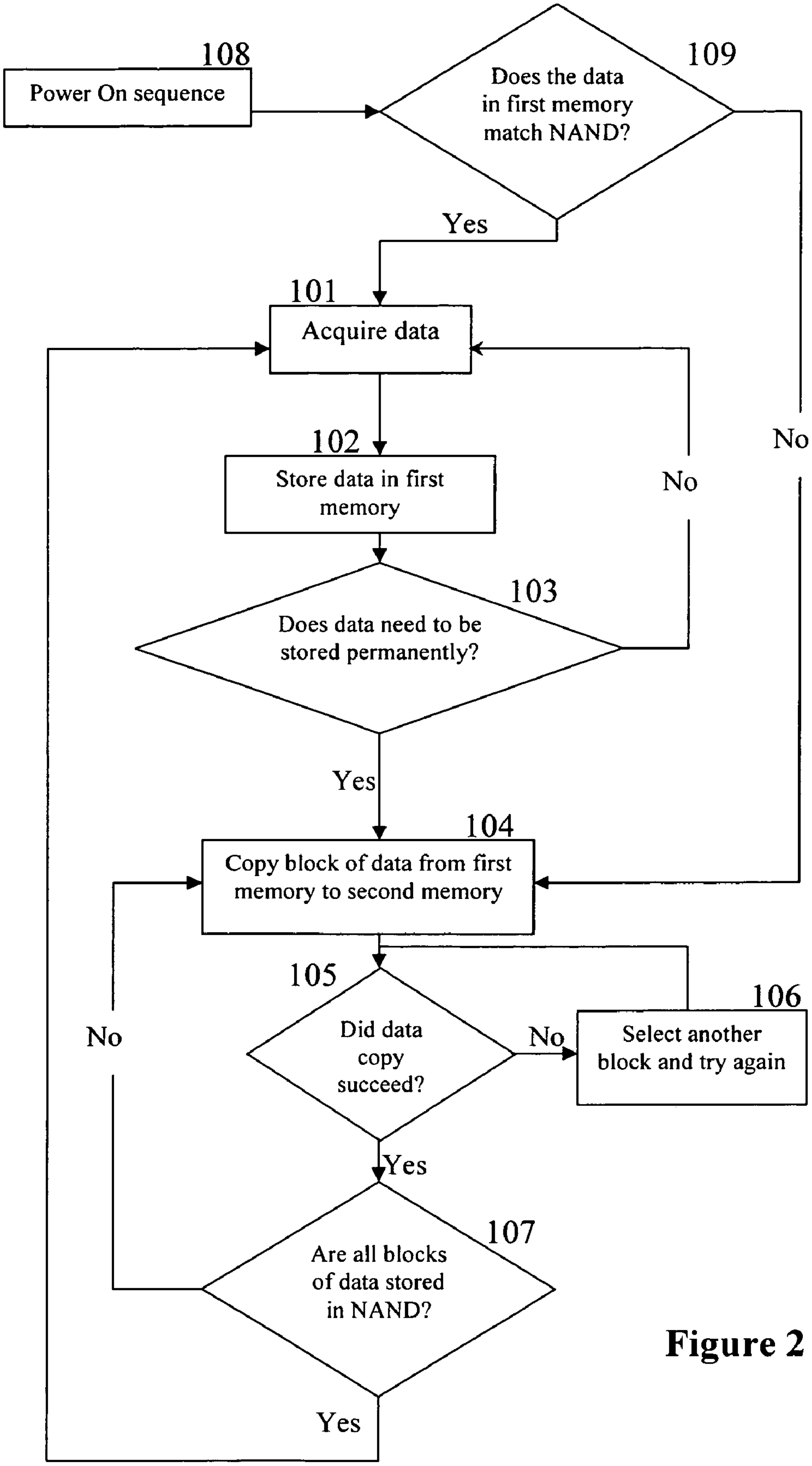
FIG. 2 is an exemplary flow diagram schematically representing an embodiment of the method for collecting data related to the status of an electrical power system according to the present invention.

As illustrated in FIG. 2, the method according to the present invention foresees a first phase 101 where, under operating conditions, data related to the status of the electrical power system 200 are continuously acquired by the microprocessor 2 of the relay 1. Such a microprocessor can be for example a Motorola Coldfire processor or Analog Devices Blackfin and comprises, according to solutions well known in the art and therefore here not described in details, application code running thereon and/or an operating system (OS), and/or a real-time operating system (RTOS) such as for example uClinux or Quadros.

In a phase 102 the acquired data are stored, at least temporarily, in at least one storing unit. Such storing unit is preferably constituted by a dedicated first volatile memory 3 which is operatively coupled to the microprocessor 2. Preferably, such a volatile memory 3 is constituted by a low power SRAM (Static Random Access Memory), such as for example Cypress Low-Powered CY62148VLL.

In addition, the acquired data can be temporarily stored also in a system memory 4 operatively coupled to the microprocessor 2. The system memory 4 is constituted by a volatile memory which is larger than the first memory 3.

Under normal operating conditions, data are continuously acquired and stored in the SRAM memory unit 3 which allows to have an ideally non-limited number of writing/erasing operations.

Upon the occurrence and detection of an event 103 indicative of a particular condition which requires related data to be permanently saved, in a phase 104 the data stored in the first volatile memory 3 is copied by the microprocessor 2. Then, in a phase 105, the copied data are written and permanently stored in a second non-volatile memory 5 also operatively associated with the microprocessor 2. Preferably the non-volatile memory 5 is a NAND flash memory, such as for example ST Micro NAND01GW.

Possible events that may require to permanently store data corresponding to such states of the power system are for example, but not limited to: tripping of a circuit breaker (not illustrated) associated with the relay 1 so as to interrupt the flow of current along the line 201; external I/O commands coming from other devices, such as for example inputs from users on a control panel; record of data triggered by a logic internal to the relay, for example for periodic monitoring; switching off and thereafter on the power feeding the relay, et cetera.

Figure 3:
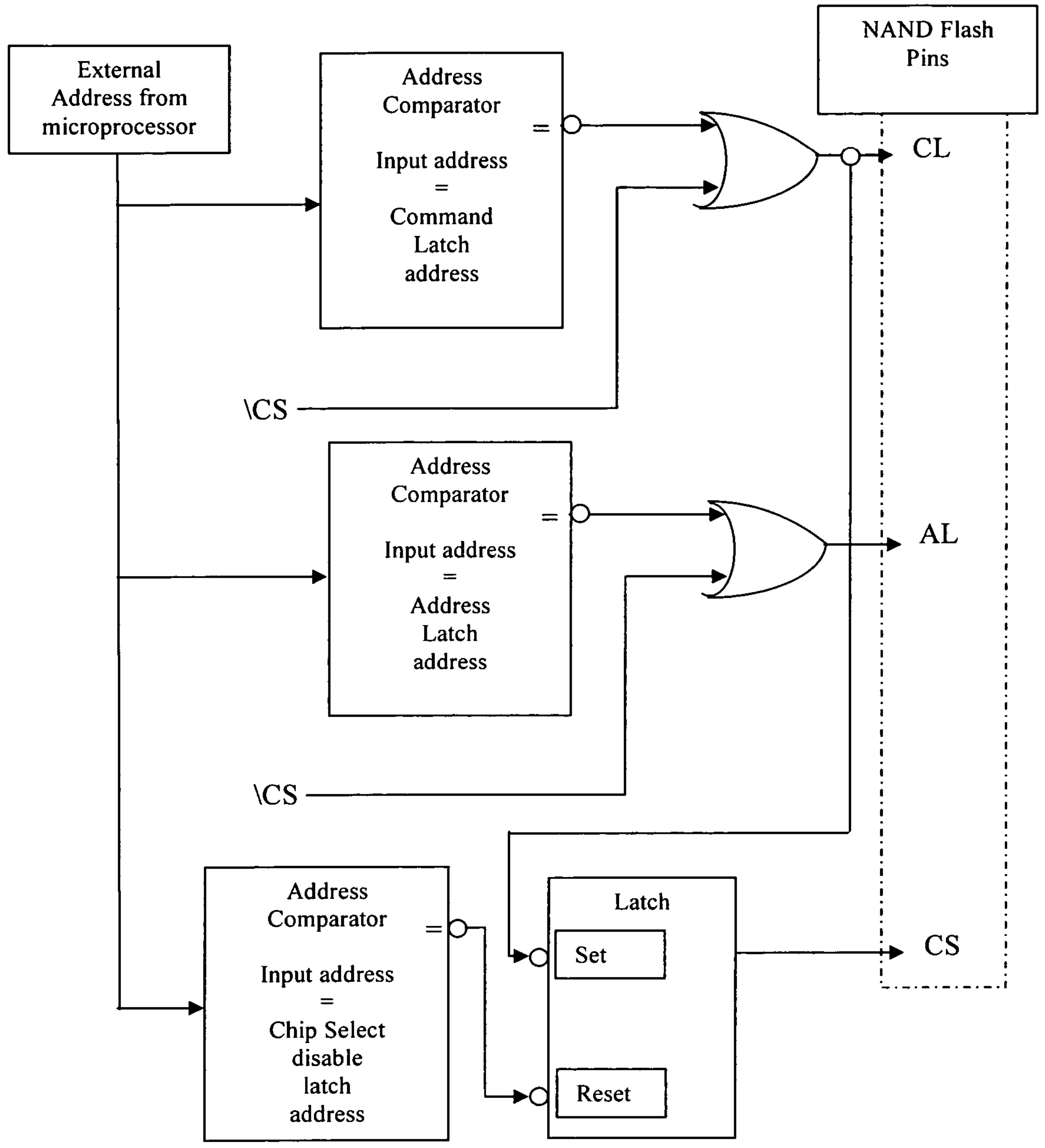
FIG. 3 schematically shows a possible embodiment of an electronic logic circuit used in the electronic relay of FIG. 1.

In particular, the relay 1 comprises an electronic logic circuit 6 for operatively interfacing the microprocessor with the NAND flash memory 5. An example of such an electronic logic circuit is illustrated in FIG. 3. Alternatively, the relay can have a dedicated port for directly connecting with the NAND flash memory 5.

The method according to the invention foresees a phase 106 where it is verified if the data copied from the first volatile memory 3 has been correctly stored in the non-volatile memory 5. When the result of this verification turns out to be negative, i.e. the data copied from the first volatile memory 3 has not been correctly stored in the second non-volatile memory 5, there is a phase 107 where it is tried again to permanently store in the second non-volatile memory 5 the data copied from the first volatile memory 3.

This attempt is repeated until it results from a step 108 that the data copied is successfully stored in the non-volatile memory 5.

In particular, the relay 1 comprises a driver 7 for writing, i.e. storing the data copied in the second non volatile memory 5, and comparing the data stored in the second non volatile memory with data copied from the first volatile memory 3. In practice, the driver 7, which is preferably constituted by a software module embedded into the microprocessor 2, tries to write onto the NAND flash memory 5 the data copied by the microprocessor 2 from the first memory 3. The driver 7 then reads data back from the NAND flash memory 5 and compares what it tried to write on the memory 5 itself versus what it reads back. If the data is not the same the driver 7 will then try to write the data in a block(s) of the memory 5 different from the block(s) where it tried to write during the previous attempt. The driver 7 will continue to carry out these operations until it reads back what it tried to write in the memory 5, i.e. until there is a confirmation that data copied from the first memory 3 is correctly stored in the second memory 5.

Alternatively, the driver 7 may be realized as a part of the hardware of the microprocessor 2.

In a preferred embodiment of the present invention, the first volatile memory 3 is provided with a source of auxiliary power. Preferably, such a memory 3 is constituted by a low power battery-backed SRAM. In this way the memory 3 is transformed into a non-volatile memory and can permanently store data if needed, for example when power feeding the relay is switched off, thus preventing to loose relevant data related to this operating condition.

Accordingly, upon the occurrence of a condition when the power feeding the relay 1 is switched off data is permanently stored in the memory 3 thanks to the auxiliary source of power. In this case, when the power is switched on again (condition indicated by reference 109), the method according to the invention foresees a phase 110 where it is verified if pertinent data stored in the first volatile memory 3 before the power feeding the relay 1 was switched off matches with the data stored in the second non-volatile memory 5.

When the data stored in the first volatile memory 3 before the power feeding the relay 1 was switched off does not match with the data stored in the second non-volatile memory 5, a phase 104 is carried out again as described above. Therefore, the data stored in the first volatile memory 3 before the power feeding the relay 1 is switched off is first copied and then, at phase 105, permanently stored in the second non-volatile memory 5. Also in this operating condition, phases 106-108 are carried out, i.e. it is first verified if the relevant data has been correctly stored in the second non-volatile memory 5. If this is not the case, there is a new attempt to permanently store in the second non-volatile memory 5 the data stored in the first memory 5 in an another block of memory different from the one where the previous attempt was made. This attempt is repeated until it results from step 108 that the data copied are successfully stored in the non-volatile memory 5.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for collecting data related to a status of an electrical power system operatively coupled with a microprocessor-based relay, comprising:

acquiring data from said electrical power system;

storing at least temporarily the acquired data in a first volatile memory;

upon the occurrence of an event, copying the data stored in said first volatile memory and permanently storing the copied data in a second non-volatile memory; and after the cessation of the event, verifying if the data copied from said first volatile memory has been correctly stored in said second non-volatile memory.

2. The method of claim 1, further comprising:

when the data copied from said first volatile memory has not been correctly stored in said second non-volatile memory, trying again to permanently store in said second non-volatile memory said data copied from the first volatile memory; and verifying again if the copied data has been correctly stored in said second non-volatile memory.

3. The method of claim 1, wherein said first volatile memory is provided with a source of auxiliary power, the event is a loss of power to the relay and the cessation of the event is a return of power to the relay.

4. The method of claim 1, wherein said first volatile memory is a battery-backed low power SRAM and said second non-volatile memory is a NAND flash memory.

5. An electronic relay for collecting data related to a status of an electrical power system operatively coupled therewith, comprising:

a microprocessor operable to continuously acquire data from said electrical power system;

a first volatile memory for storing at least temporarily the acquired data; and a second non-volatile memory for permanently storing thereon data copied from said first volatile memory upon the occurrence of a tripping of a circuit breaker associated with the relay or the receipt of a command from another device.

6. The electronic relay of claim 5, further comprising an electronic logic circuit for interfacing said microprocessor with said second non-volatile memory.

7. The electronic relay of claim 5, wherein said first volatile memory is provided with a source of auxiliary power.

8. The electronic relay of claim 5, wherein said first volatile memory is a low power battery-backed SRAM and said second non-volatile memory is a NAND flash memory.

9. The electronic relay of claim 5, further comprising a driver module for storing data in said second non volatile memory and comparing the data stored in said second non volatile memory with data copied from the first volatile memory.

10. An electronic relay for collecting data related to a status of an electrical power system operatively coupled therewith, comprising:

a microprocessor, a first volatile memory for at least temporarily storing data, and a second non-volatile memory for permanently storing data thereon, wherein said microprocessor has thereon computer usable program code configured to:

acquire data from said electrical power system;

store the acquired data in said first volatile memory;

upon the occurrence of an event, copy the data stored in said first volatile memory and permanently store the copied data in a second non-volatile memory; and after the cessation of the event, verifying if the data copied from said first volatile memory has been correctly stored in said second non-volatile memory.

11. The electronic relay of claim 10, wherein said computer usable program code further comprises code configured to:

try again to permanently store in said second non-volatile memory said data copied from the first volatile memory when the data copied from said first volatile memory has not been correctly stored in said second non-volatile memory; and verify again if the copied data has been correctly stored in said second non-volatile memory.

12. The electronic relay of claim 10, wherein said first volatile memory is provided with a source of auxiliary power, the event is a loss of power to the relay and the cessation of the event is a return of power to the relay.

13. The electronic relay of claim 10, wherein said first volatile memory is a battery-backed low power SRAM and said second non-volatile memory is a NAND flash memory.

* * * * *